(12) United States Patent
Watanabe

(10) Patent No.: US 8,086,069 B2
(45) Date of Patent: Dec. 27, 2011

(54) DATA-GENERATING APPARATUS, METHOD, AND PROGRAM FOR IMAGE FORMING

(75) Inventor: Kenichi Watanabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1368 days.

(21) Appl. No.: 11/481,837

(22) Filed: Jul. 7, 2006

(65) Prior Publication Data

US 2007/0014474 A1    Jan. 18, 2007

(30) Foreign Application Priority Data

Jul. 8, 2005 (JP) ................. 2005-200479

(51) Int. Cl.
*G06K 9/40* (2006.01)
*G06K 9/36* (2006.01)
*G06K 9/32* (2006.01)
*G06K 15/02* (2006.01)
*G09G 5/00* (2006.01)
*H04N 1/60* (2006.01)

(52) U.S. Cl. ........ 382/276; 382/254; 382/295; 382/296; 382/298; 345/581; 345/619; 358/1.2; 358/1.9

(58) Field of Classification Search .......... 382/174; 358/1.9
See application file for complete search history.

(56) References Cited

U.S. PATENT DOCUMENTS

| | | | |
|---|---|---|---|
| 5,111,533 A | | 5/1992 | Sekine et al. |
| 5,291,308 A | * | 3/1994 | Onodera ............ 358/448 |
| 5,748,860 A | * | 5/1998 | Shively ............ 358/1.15 |
| 5,790,093 A | * | 8/1998 | Takahashi .......... 345/472 |
| 5,878,194 A | * | 3/1999 | Koga ............... 358/1.9 |
| 6,275,253 B1 | * | 8/2001 | Melen ............... 348/43 |
| 6,445,463 B1 | * | 9/2002 | Klassen ............. 358/1.9 |

(Continued)

FOREIGN PATENT DOCUMENTS

| | | |
|---|---|---|
| JP | 4-051666 A | 2/1992 |
| JP | 8-254973 A | 10/1996 |
| JP | 9-016147 A | 1/1997 |
| JP | 9-134423 A | 5/1997 |
| JP | 9-207385 A | 8/1997 |

(Continued)

OTHER PUBLICATIONS

Japanese Notification of Reasons of Rejection, w/ English translation thereof, issued in Japanese Patent Application No. JP 2005-2200479 dated Jan. 27, 2009.

*Primary Examiner* — Vikkram Bali
*Assistant Examiner* — Michelle Entezari
(74) *Attorney, Agent, or Firm* — Banner & Witcoff, Ltd

(57) ABSTRACT

A data-generating apparatus comprising a bitmap data-generating unit to generate binary bitmap data indicating an image-formed area and an image-excluding area based on the figure information in response to the figure-describing data being inputted, a judging unit to judge whether modifying information is included in the figure-describing data, a modifying unit to modify the bitmap data based on the modifying information, and an image-forming data-generating unit to generate the image-forming data based on the bitmap data modified by the modifying unit and the pattern information in response to the judging unit determining that the modifying information is comprised in the figure-describing data and generates the image forming data based on the bitmap data generated by the bitmap data-generating unit and the pattern information in response to the judging unit determining that no modifying information is comprised in the figure-describing data, is provided.

16 Claims, 4 Drawing Sheets

U.S. PATENT DOCUMENTS

| | | | |
|---|---|---|---|
| 6,738,154 B1 * | 5/2004 | Venable | 358/1.15 |
| 6,847,374 B2 * | 1/2005 | Matsuda | 345/589 |
| 7,167,266 B2 * | 1/2007 | Sakai et al. | 358/1.15 |
| 7,227,986 B2 * | 6/2007 | Wakasugi | 382/162 |
| 7,548,925 B2 | 6/2009 | Bradlee et al. | |
| 7,643,160 B2 * | 1/2010 | Kadota | 358/1.11 |
| 7,714,879 B2 * | 5/2010 | Asai et al. | 345/660 |
| 7,742,196 B2 * | 6/2010 | Uchida et al. | 358/3.28 |
| 7,796,280 B2 * | 9/2010 | Matsuzaka et al. | 358/1.13 |
| 7,813,577 B2 * | 10/2010 | Kotani et al. | 382/254 |
| 7,856,145 B2 * | 12/2010 | Ando et al. | 382/190 |
| 2003/0078720 A1 | 4/2003 | Adachi | |
| 2004/0257622 A1 * | 12/2004 | Shibaki et al. | 358/2.1 |
| 2007/0070089 A1 | 3/2007 | Asai et al. | |

FOREIGN PATENT DOCUMENTS

| | | |
|---|---|---|
| JP | 10-293659 A | 11/1998 |
| JP | 2001-344081 A | 12/2001 |
| JP | 2004-078025 A | 3/2004 |
| JP | 2004-276537 A | 10/2004 |
| JP | 2005-111718 A | 4/2005 |

* cited by examiner

DATA-GENERATING APPARATUS, METHOD, AND PROGRAM FOR IMAGE FORMING

CROSS REFERENCE TO RELATED APPLICATION

This application claims priority from Japanese Patent Application No. 2005-200479, filed on Jul. 8, 2005, the entire subject matter of which is incorporated herein by reference.

BACKGROUND

1. Technical Field

Aspects of the invention relate to a data-generating system and a method to generate data that is used to form image on a recording medium and a display unit of a display device, and to a program to execute the method on a microcomputer.

2. Related Art

Conventionally, a data-generating system for image-forming, which generates image-forming data according to figure-describing data and outputs the image-forming data to an image-forming system such as a printer and a display device, is known. The data-generating system generates the image-forming data when the figure-describing data (including figure information that indicates properties of a figure, such as a size and a shape, and pattern information that indicates design properties of the figure, such as a color and a pattern) is inputted.

Such an image-generating system includes two types. A first type generates image-forming data based on the figure information and the pattern information to output the image-forming data to an output device, such as a printer, as the output device creates bitmap image (raster image) data based on the image-forming data. A second type generates raster image data based on the figure-describing data and outputs the generated raster image data to the output device as image-forming data.

More specifically, the first type of the image-generating system generates image-forming data based on figure information and pattern information each time figure-describing data is inputted and then outputs the generated image-forming data to the printer. Thus, the printer creates a bitmap image (in which a figure based on the figure information is combined with a pattern based on the pattern information), based on the image-forming data and prints the bitmap image on a recording sheet.

The second data-generating system, on the other hand, creates bitmap image data (based on figure information and pattern information contained in figure-describing data) every time the figure-describing data is inputted by combining a figure and a pattern, and outputs the bitmap image data to the printer as image-forming data so that the printer outputs the bitmap image on a recording sheet. An example of the image-generating system of the second type is disclosed in Japanese Patent Provisional Publication No. HEI10-293659.

When the figure-describing data contains information to modify the figure in the first data-generating system, the printer is operated to create the bitmap image data and thereafter modify the figure according to the modifying information. On the other hand, the second data-generating system is adapted to create the bitmap image data and thereafter modify the bitmap image data according to the modifying information.

In the above configurations, the modification is applied to the multi-valued bitmap image data, which is the figure being applied with the pattern according to the figure information and the pattern information as the bitmap image data is modified. Thus, an increased volume of memory is required for a modification process.

SUMMARY OF THE INVENTION

In view of the foregoing drawbacks, aspects of the present invention are advantageous in that a data-generating system, a data-generating method, and a program for image-forming are provided, using less memory for modifying image-forming data.

BRIEF DESCRIPTION OF THE ACCOMPANYING DRAWINGS

DETAILED DESCRIPTION

Figure 1:
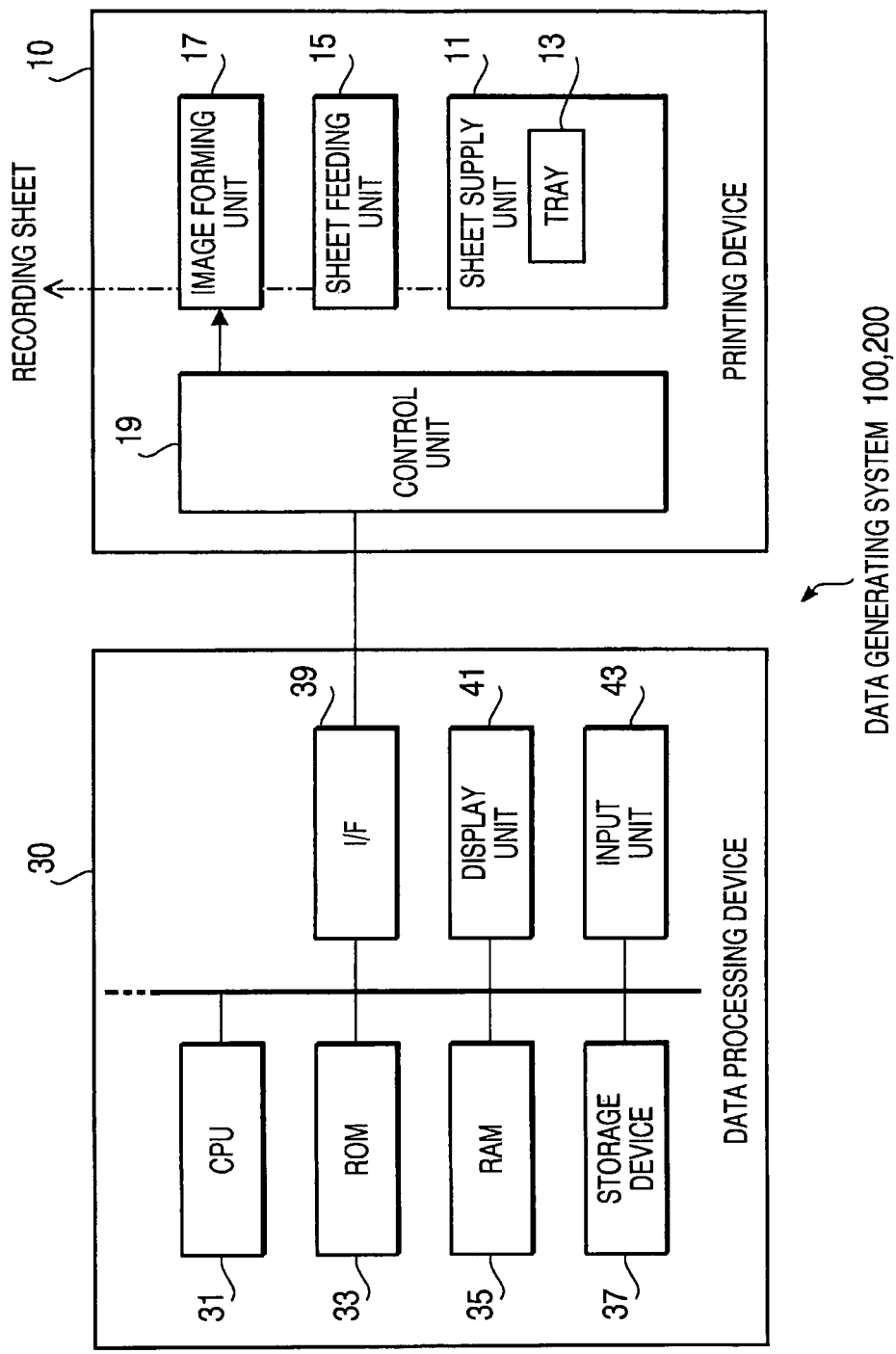
FIG. 1 shows a block diagram to illustrate an image-forming system according to a first embodiment of the invention.

General Overview of Aspects of the Invention

The following describes general aspects of the invention that may or may not be comprised in various embodiments and modifications. It should be noted that various connections are set forth between elements in the following description. These connections, in general and, unless specified otherwise, may be direct or indirect and this specification is not intended to be limiting in this respect.

According to some aspects of the invention, there is provided a data-generating apparatus capable of generating image-forming data for forming an image of a figure based on figure-describing data comprising figure information and pattern information in response to the figure-describing data being inputted thereto. The data-generating apparatus comprises a bitmap data-generating unit that generates binary bitmap data indicating an image-formed area and an image-excluding area in response to the figure-describing data being inputted, wherein the image-formed area comprises an area wherein the figure is formed and the image-excluding area comprises an area wherein no figure is formed, a judging unit that judges whether modifying information is comprised in the figure-describing data in response to the bitmap data being generated, the modifying information comprising information used to modify the figure, a modifying unit that modifies the bitmap data based on the modifying information in response to the modifying information being determined to be comprised in the figure-describing data by the judging unit, and n image-forming data-generating unit that generates the image-forming data based on the bitmap data modified by the modifying unit and the pattern information in response to the judging unit determining that the modifying information is comprised in the figure-describing data and generates the image forming data in response to the judging unit determining that no modifying information is comprised in the figure-describing data.

Optionally, the figure information may indicate properties of the figure comprising a shape, a size, and a position of the figure with respect to a recording medium on which the figure is formed, and the pattern information may indicate design properties of the figure comprising a color and a pattern.

According to the above configuration, the image-generating system uses the binary bitmap data generated based on the figure information to modify the figure according to the modifying information when the modifying information is included in the figure-describing data.

Therefore, the figure can be modified in a less complicated manner, and a volume of the memory device required to the modification process can be reduced. Further, the data forming unit can be used in cooperation with an image forming apparatus that generates a raster image based on image forming data that comprises the figure information and the pattern information.

It should be noted that figure information generally comprises information to describe properties of the figure as a series of lines that indicate a contour of the figure and information to describe the properties as a series of points (i.e., bitmap data). As a conventional image-forming apparatus generates image-forming data for a raster image, if the figure information comprises the information described as a series of lines, the figure information is converted to bitmap data.

In the present invention, however, the image-forming data is generated based on the pattern information and bitmap data that is binary according to the figure information. Therefore, even if the figure in the figure information is described as a series of lines, the image-forming apparatus is not required to convert the figure information into bitmap data.

According to the configuration described above, if an image-forming apparatus employed in the data-generating apparatus can generate a raster image corresponding to the figure information, even if the figure indicated in the figure information is described as a series of lines, and the image-forming apparatus is not adapted to convert the figure information into bitmap data. It should be noted that the image-forming apparatus may comprise a printing device to form an image on a recording medium (such as paper) and a display device with a display unit.

Optionally, the shape of the figure may be described as a series of lines that indicate a contour of the figure.

According to the data-generating apparatus as described above, as described above, the image-forming apparatus can generate the image-forming data even when the shape of the figure indicated in the figure information is described as a series of lines that indicate a contour of the figure.

Optionally, the data generating apparatus may further comprise a partial data-generating unit that generates at least one piece of partial data for forming the figure by applying the design properties indicated in the pattern information to the image-formed area of the bitmap data in response to the judging unit determining that the modifying information is included in the figure-describing data, and generates at least one piece of partial data for forming the figure by applying the design properties indicated in the pattern information to the image-formed area of the bitmap data generated by the bitmap data-generating unit in response to the judging unit determining that no modifying information is comprised in the figure-describing data. The image-forming data-generating unit may combine the at least one piece of the partial data to generate the image forming data.

According to the above configuration, the at least one piece of partial data for forming the figure is generated in the data-forming unit. Thus, even an image-forming apparatus that is not capable of generating the partial data can be used in cooperation with the data-generating apparatus of the present invention to form the image.

Optionally, the partial data-generating unit may use the bitmap data as mask data indicating the image-excluding area being masked and apply the design properties indicated in the pattern information to the image-formed area of the bitmap data when the partial data is generated.

According to the above configuration, the bitmap data is used as mask data indicate the image-excluding area being masked. Thus, a pattern of the figure indicated by the pattern information can be applied merely to the image-formed area as the partial data is generated, so that the figure-describing data (including the figure information and the pattern information) can be processed to form the figure in a less complicated manner.

Optionally, the modifying information may comprise information for modifying a character corresponding to the figure information so that the character is output to be in a bold font provided to the data-generating apparatus. The bitmap data-generating unit may generate binary bitmap data corresponding to the character in normal font in response to the figure-describing data being inputted. The modifying unit may generate bitmap data corresponding to the character in the bold font based on the bitmap data corresponding to the character in the normal font in response to the judging unit determining that the figure-describing data comprises modifying information to modify a character in the normal font into a character in the bold font.

According to the above configuration, as the character is modified to be formed in bold font, bitmap data for the character in bold font is generated based on binary bitmap data for the character in normal font, which is provided to the image-forming apparatus or to the data-generating apparatus. Therefore, even if the image-forming apparatus and the data-generating apparatus are not provided with bold font data, the bitmap data for the character in bold font can be generated by using the bitmap data for the character in normal font in a less complicated manner.

According to another aspect of the invention, there is provided a method for generating image forming data for forming an image of a figure based on figure-describing information comprising figure information and pattern information in response to the figure-describing data being inputted to a data-generating apparatus. The method comprises generating binary bitmap data that indicates an image-formed area and an image-excluding area based on the figure information in response to the figure-describing data being inputted wherein the image-formed area comprises an area wherein the figure is formed and the image-excluding area comprises an area wherein no figure is formed, determining whether modifying information is included in the figure-describing data in response to the bitmap data being generated wherein the modifying information comprises information used to modify the figure, modifying the bitmap data based on the modifying information in response to the modifying information being determined to be included in the figure-describing data, generating the image-forming data based on the modified bitmap data and the pattern information in response to the modifying information being determined to be comprised in the figure-describing data, and generating the image-forming data based on the generated bitmap data and the pattern information in response to the no modifying information being judged to be included in the figure-describing data.

Optionally, the figure information may indicate properties of the figure comprising a shape, a size, and a position of the figure with respect to a recording medium on which the figure is formed. The pattern information may indicate design properties of the figure comprising a color and a pattern.

With the method described above, advantages of the data-generating apparatus described above can be achieved.

Optionally, the shape of the figure may comprise a series of lines that indicate a contour of the figure.

Optionally, the method may comprise generating at least one piece of partial data for forming the figure by applying the design properties indicated in the pattern information to the image-formed area of the modified bitmap data in response to the modifying information being determined to be included in the figure-describing data, generating at least one piece of partial data for forming the figure by applying the design properties indicated in the pattern information to the image-formed area of the generated bitmap data in response to no modifying information being determined to be included in the figure-describing data, and combining the at least one piece of the partial data to generate the image forming data.

Optionally, the bitmap data may be used as mask data indicating the image-excluding area being masked when the partial data is generated, and the design properties indicated in the pattern information may be applied to the image-formed area of the bitmap data when the partial data is generated.

Optionally, the modifying information may comprise information for modifying a character corresponding to the figure information so that the character is output to be in a bold font. Binary bitmap data corresponding to the character in normal font may be generated in response to the figure-describing data being inputted. A process to generate bitmap data corresponding to the character in the bold font may be executed in response to modifying information to modify a character in the normal font into a character in the bold font being determined to be comprised in the figure-describing data.

According to another aspect of the invention, there is provided a computer-readable medium comprising computer readable instructions that cause a computer to execute steps of generating binary bitmap data that indicates an image-formed area and an image-excluding area based on figure information for forming a figure in response to figure-describing data comprising the figure information and pattern information being inputted wherein the image-formed area comprises an area wherein the figure is formed and the image-excluding area comprises an area wherein no figure is formed, determining whether modifying information is included in the figure-describing data in response to the bitmap data being generated wherein the modifying information comprises information used to modify the figure, modifying the bitmap data based on the modifying information in response to the modifying information being determined to be included in the figure-describing data, generating the image-forming data based on the modified bitmap data and the pattern information in response to the modifying information being determined to be included in the figure-describing data, and generating the image-forming data based on the generated bitmap data and the pattern information in response to no modifying information being determined to be included in the figure-describing data.

With the above configuration, when the computer readable medium described above is installed in a general-purpose computer, the computer can be configured to be the data-generating apparatus of the present invention. Further, as the program described above is stored in an image-processing device such as a printer and a display device, functionalities of the data-generating apparatus of the present invention can be achieved in the image-processing device.

Embodiment

Hereinafter referring to the accompanying drawings, an image-forming system according to a first embodiment of the invention will be described. FIG. 1 shows a block diagram to illustrate a configuration of an image-forming system 100 according to a first embodiment of the invention.

The image-forming system 100 includes a printing device 10 and a data processing device 30, which are communicably connected with each other. The printing device 10 is a known printing device, such as an inkjet printer or a laser printer having a sheet supply unit 11, a sheet-feeding unit 15, an image-forming unit 17, and a control unit 19 that controls operations of these units.

The sheet supply unit 11 includes a sheet tray 13 wherein a bundle of recording sheets cut in a same size is arranged. During a sheet-feeding operation, one of the recording sheets that is on top of the bundle is sequentially carried in a predetermined direction to the sheet-feeding unit 15.

The recording sheet fed from the sheet tray 13 is carried to a recording position of the image-forming unit 17 by the sheet-feeding unit 15. The image-forming unit 17 forms an image on the recording sheet at the recording position according to image-forming data inputted from the data processing device 30.

When the printing device 10 is an inkjet printer, an inkjet head (not shown) to eject ink onto the recording sheet is linearly reciprocated in a main scanning direction, which is perpendicular to a sheet-feeding direction, to form lines that contain pieces of the image, so that an entire image is eventually formed on the recording sheet. When the printing device 10 is a laser printer, a toner image formed on a latent image carrying roll is transferred to the recording sheet as the recording sheet passes through a contact position of the latent image carrying roll and a transfer roll in the image-forming unit 17. The image is thus formed in a direction corresponding to the sheet-feeding direction on the recording sheet. The recording sheet is thereafter discharged in a discharge tray (not shown).

Each of the units described above is controlled by the control unit 19, which is communicably connected with the data processing device 30. As an image-forming instruction is inputted from the data processing device 30, the control unit 19 controls the image-forming unit 17 based on the image-forming data so that the image is formed on the recording sheet.

The data processing device 30 includes a CPU 31, a ROM 33, a RAM 35, a storage device (for example, a hard disk drive) 37, an I/F (interface) unit 39, a display unit 41, and an input unit 43. The CPU 31 executes various processes in the data processing device 30. The ROM 33 is a memory device to store various programs therein. The RAM 35 is used as a work memory (a work area) wherein a program is run by the CPU 31. The storage device 37 stores the various data and application software therein. The I/F unit 39 interconnects the data processing device 30 and the printing device 10 so that the data processing device 30 and the printing device 10 can communicate with each other. The display unit 41 includes a displaying system (not shown) such as a liquid crystal display to display various information thereon. The input unit 43 includes an inputting system, such as a pointing device (for example, a mouse) and a keyboard.

When an data-generating instruction for image-forming is inputted by a user via the input unit 43, the data processing device 30 generates image-forming data based on figure-describing data that is inputted to the CPU 31 in response to the data-generating instruction, and outputs the image-forming data to the printing device 10. The image-forming data refers to data that is used for forming an image on a recording sheet. The figure-describing data includes figure information, which indicates a shape of a figure to be printed as a part of an entire image and a position of the figure with respect to the recording sheet, and pattern information, which indicates design properties of the figure. Further, the figure-describing data may include modifying information, which is used for modifying the figure.

As the data-generating instruction for image-forming is inputted to the data processing device 30 via the input unit 43, an image-forming instruction to instruct the printing device 10 to form the image on the recording sheet is inputted to the CPU 31. The image-forming instruction is thereafter output to the printing device 10 so that the printing device 10 forms the image based on the image-forming data.

Figure 2:
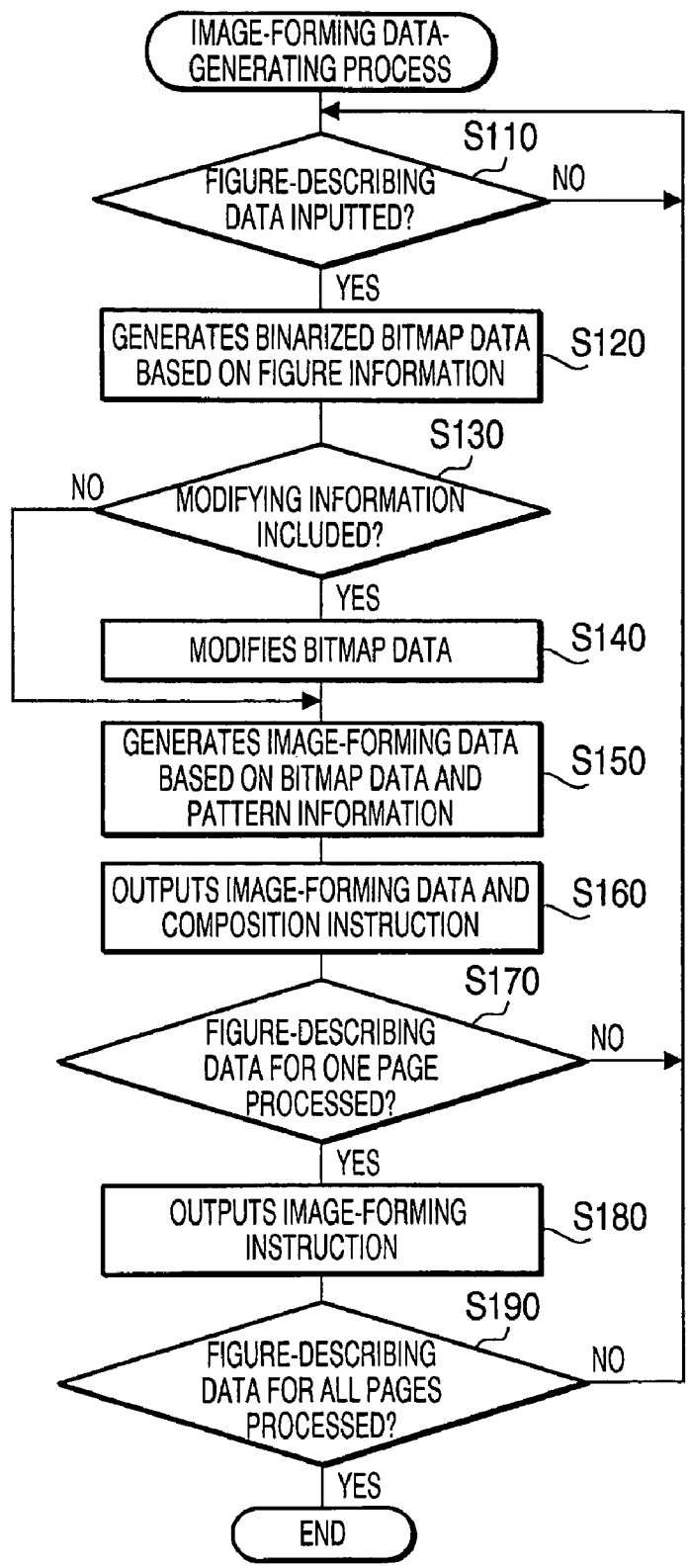
FIG. 2 shows a flowchart to illustrate a process executed in the image-forming system according to the embodiment of the invention.

Referring to FIG. 2, a process to be executed in the image-forming system 100 will be described. FIG. 2 shows a flowchart to illustrate the process executed by the CPU 31 of the data processing device 30 when the data-generating instruction for image-forming is inputted to the data processing device 30 via the input unit 43.

As the data-generating instruction for image-forming is inputted via the input unit 43, the CPU 31 of the data processing device 30 starts the process. In S110, the CPU 31 examines whether figure-describing data is inputted. If the CPU 31 determines that no figure-describing data is inputted (S110: NO), the CPU 31 repeats S110 until figure-describing data is inputted.

When the CPU 31 judges that figure-describing data is inputted (S110: YES), the process proceeds to S120, wherein the CPU 31 creates binary bitmap data based on the figure information in the figure-describing data. The bitmap data includes data for an image-formed area, wherein a figure is formed on the recording sheet when an image including the figure is printed, and data for an image-excluding area, wherein no figure is formed on the recording sheet when the image including the figure is printed.

In the present embodiment, in S120, the bitmap data for forming (binary) outline characters is created by generating the figure based on the figure information and filling image-formed area of the figure with white. Further, in the present embodiment, the created bitmap data is used as mask data, wherein the image-excluding area is masked.

Next, in S130, the CPU 31 examines whether the modifying information is included in the figure-describing data. When the CPU 31 determines that the modifying information is included (S130: YES), the process proceeds to S140. In S140, the CPU 31 modifies the bitmap data created in S120 according to the modifying information. Thereafter, the process proceeds to S150. In S130, when the process determines that no modifying information is included (S130: NO), the process proceeds to S150.

In S150, the CPU 31 generates image-forming data based on the bitmap data and the pattern information. More specifically, in S130, if the CPU 31 has determined that the figure-describing data included the modifying information, the CPU 31 in S150 generates image-forming data based on the bitmap data modified in S140 and the pattern information. If the CPU 31 has determined that the figure-describing data included no modifying information, the CPU 31 in S150 generates image-forming data based on the bitmap data created in S120 and the pattern information. The process proceeds to S160.

In S160, the CPU 31 outputs the image-forming data generated in S150 and a composition instruction to the printing device 10. The composition instruction is an instruction to cause the image-formed area of the bitmap data to be filled in with a color in accordance with the pattern information.

The printing device 10 that received the composition instruction applies the pattern information on the bitmap data inputted from the data processing device 30 based on the image-forming data. Thus, the figure with the image-formed area thereof being filled with a color based on the pattern information is generated as a part of the image. Each time image-forming data is inputted to the printing device 10 from the data processing device 30, a figure with the image-forming area thereof being filled in with a color is generated as a part of the image. As a plurality of the figures is combined, entire image data corresponding to the image to be printed on the recording sheet is generated.

In S170, the CPU 31 examines whether the figure-describing data corresponding to one page of the recording sheet has been processed. When the CPU 31 determines that at least one piece of the figure-describing data remains unprocessed (S170: NO), the process returns to S110. When the CPU 31 determines that entire figure-describing data for one page of the recording sheet has been processed (S170: YES), the process proceeds to S180.

In S180, the CPU 31 outputs an image-forming instruction to the printing device 10. The image-forming instruction is an instruction to cause the printing device 10 to form the image on the recording sheet. As the printing device 10 receives the image-forming instruction, the image is formed on the recording sheet.

In S190, the CPU 31 examines whether the image-forming data corresponding to all the pages to be printed on the recording sheets is generated. When the CPU 31 determines that the image-forming data to be generated remains unprocessed (S190: NO), the process returns to S110. When the CPU 31 determines that the entire image-forming data for all the pages is generated (S190: YES), the CPU 31 terminates the process.

It should be noted that in S120 and S140 of the present embodiment, the bitmap data is created and modified by executing a ROP (rasterize operation), which is supported by GDI (graphic device interface) of Windows™, however, a method to create and modify the bitmap data is not limited to the ROP. The ROP is a logical operation to be executed when at least one object (i.e., at least one piece of bitmap data) is laid over one object. As the ROP is applied, various printing effects, such as water mark printing (i.e., a semitransparent figure being laid over another figure), can be applied to the objects as the image is printed.

Next, an operation executed by the data processing device 30 and the printing device 10 when the data-generating instruction for image-forming is inputted to the data processing device 30 via the input unit 43 will be described. FIGS. 3A-3E show figures to be generated as the data processing device 30 and the printing device 10 interact according to the first embodiment of the invention. In the present embodiment, an operation to form an image shown in FIG. 3E will be described as an example. In the image in FIG. 3E, it is assumed that an oval is painted in yellow, while characters "ABCDE" are drawn in blue.

Figure 3A:
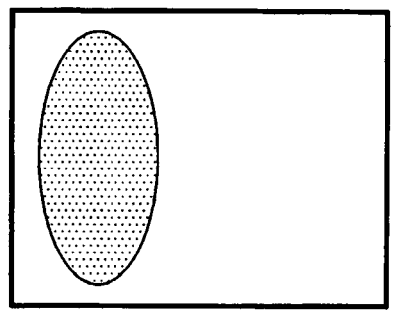
FIG. 3A-3E show data processing system and a printer interacting according to the first embodiment of the invention.

When data-generating instruction for image-forming is inputted to the data processing device 30 via the input unit 43, figure-describing data, including figure information and pattern information, is inputted to the CPU 31. The figure information indicates that a shape of the figure (i.e., an oval), while the pattern information indicates a color of the figure (i.e., yellow). The data processing device 30 creates binary bitmap data that indicates a colorless (i.e., white) oval based on the figure information, as shown in FIG. 3A.

Next, the data processing device 30 generates image-forming data based on the created binary bitmap data and the pattern information that indicates solid yellow of the oval.

Thereafter, the data processing device 30 outputs the image-forming data along with a composition instruction to the printing device 10.

Figure 3B:
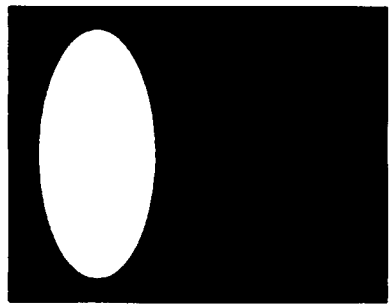

The printing device 10, which receives the image-forming data and the composition instruction, applies the pattern information on the bitmap data according to the image-forming data, so that an image-formed area (i.e., an area corresponding to the white oval) of the figure is painted in yellow according to the pattern information, as shown in FIG. 3B.

Figure 3C:
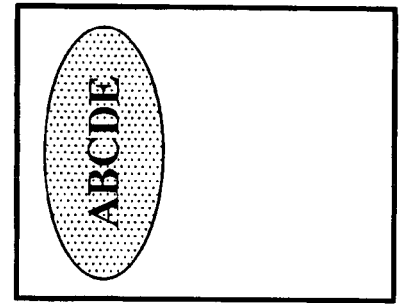
Figure 3D:
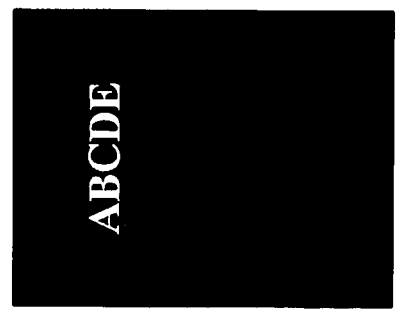

Next, figure-describing data including figure information, pattern information, and modifying information is inputted to the CPU 31 of the data processing device 30. The figure information and the pattern information indicate the characters "ABCDE" are formed in blue, while the modifying information indicates the characters are formed in bold font. The data processing device 30 creates binary bitmap data indicating the characters "ABCDE" formed in white based on the figure information, as shown in FIG. 3C. In this phase, the characters "ABCDE" are generated as characters in normal font according to normal font data provided to the data processing device 30.

Next, the data processing device 30 modifies the bitmap data based on the modifying information included in the figure-describing data by enlarging the image-formed area of the characters indicated by the bitmap data. More specifically, the image-formed area of the characters is widened in dot by dot horizontally and vertically as the bitmap data is modified, and the widened area is converted into an additional image-formed area, so that bitmap data indicating the characters in bold font is created. A number of the dots to be converted into the image-formed area depends on a size of the characters to be modified.

Next, the data processing device 30 generates image-forming data based on the modified bitmap data and the pattern information and outputs the same along with a composition instruction to the printing device 10.

As the image-forming data and the composition instruction are received, the printing device 10 applies the pattern indicated in the pattern information to the bitmap data according to the image-forming data. Thus, the image-formed area (i.e., an area of the characters painted in white) of the bitmap data is painted in blue according to the pattern information, and the bitmap data is updated. The updated bitmap data indicating the characters painted in blue is laid over the bitmap data indicating the oval painted in yellow, and the characters "ABCDE" painted in blue in bold font on the yellow oval is generated as shown in FIG. 3E.

Figure 3E:
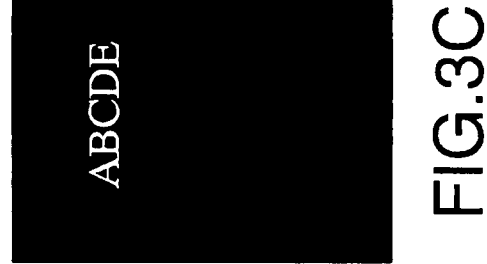

The printing device 10 that received the image-forming instruction forms an image with the blue characters in bold font in the yellow oval, as shown in FIG. 3E, on the recording sheet.

The printing device 10 that received the image forming instruction forms an image with the blue characters in boldface in the yellow oval, as shown in FIG. 3E, on the recording sheet.

As described above, when the figure-describing data includes the modifying information and the figure is modified, the data processing device 30 in the present embodiment uses the binary bitmap data generated according to the figure information and modifies the figure in the bitmap data based on the modifying information.

According to the configuration of the data processing device 30 described above, the modification is applied to the binary bitmap data, so that the volume of the memory device for the modification process can be reduced. Further, in the present embodiment, as the data processing device 30 creates the bitmap data, the printing device 10 is released from a load to create the bitmap data.

Further, according to the present embodiment, the printing device 10 uses the bitmap data as mask data indicating the image-excluding area being masked. Therefore, in the printing device 10, the pattern of the figure indicated by the pattern information can be applied to only the image-formed area of the figure. With this configuration, data including the figure information and the pattern information (i.e., the figure-describing data) can be processed to form the figure in a less complicated manner.

Furthermore, according to the present embodiment, when the figure-describing data includes the modifying information, which indicates the characters are modified to be formed in bold font, binary bitmap data for the characters in normal font, which is provided to the data processing device 30, is created, and bitmap data for the characters in bold font can be created by enlarging the image-formed area of the characters in the normal font horizontally and vertically in dots. Therefore, even if the printing device 10 is not provided with bold font data, the printing device 10 is enabled to form the characters in bold font by using the normal font and enlarging the same.

Furthermore, according to the present embodiment, as the characters and the figures to be modified are indicated in bitmap data, the modification based on the modifying information can be applied to the bitmap data, and the bitmap data can be processed in a less complicated manner.

Figure 4:
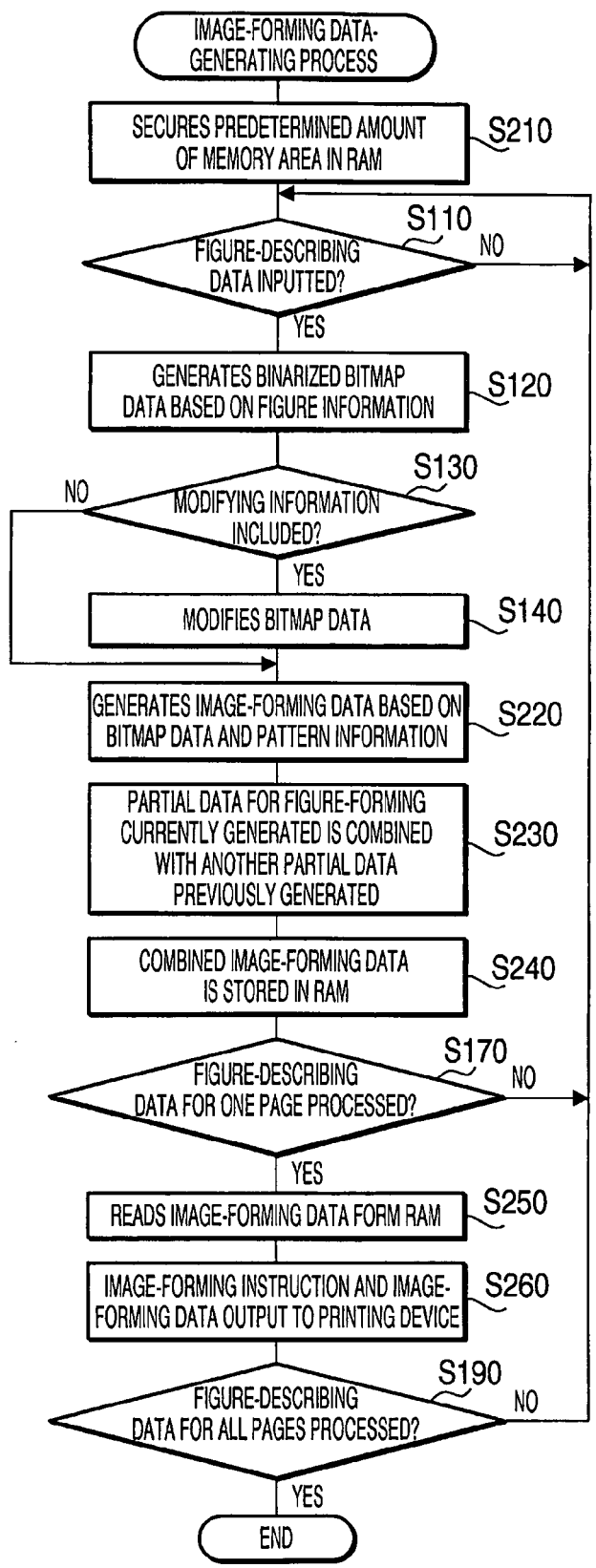
FIG. 4 shows a flowchart to illustrate a process executed in an image-forming system according to a second embodiment of the invention.

Next, referring to FIG. 4, a process to be executed in the image-forming system 200 will be described. FIG. 4 shows a flowchart to illustrate an image-forming data-generating process executed in the image-forming system 200 according to a second embodiment of the invention. In the present embodiment, steps corresponding to those of the process to be executed in the first embodiment is referred to by the identical reference numerals, and a description of those is omitted.

The present embodiment differs from the first embodiment in the image-forming data-generating process executed by the CPU 31 of the data processing device 30 in the image-forming system 200. Specifically, the data processing device 30 in the second embodiment executes a process to fill in an image-formed area of bitmap data with a color according to pattern information.

As the figure-describing data is inputted to the data processing device 30, the data processing device 30 generates partial data for figure forming based on the figure-describing data. The partial data is a piece of data for figure forming that is eventually combined to be the image-forming data. When the generated partial data is combined to be image-forming data, and when an image-forming instruction is inputted, the combined image-forming data along with the image-forming instruction is passed to the printing device 10.

As shown in FIG. 4, as the data-generating instruction for image-forming is inputted via the input unit 43, the CPU 31 of the data processing device 30 starts the process. In S210, the CPU 31 secures a predetermined amount of memory area, for example, an amount to store bitmap data corresponding to one page of the recording sheet, in the RAM 35. The process proceeds to S110.

In S110, when the CPU 31 determines that figure-describing data is inputted (S110: YES), the process proceeds to S120, and thereafter, to S130. In S130, when the process determines that no modifying information is included (S130: NO), the process proceeds to S220. When the CPU 31 determines that the modifying information is included (S130: YES), the process proceeds to S140. Following S140, the process proceeds to S220.

In S220, the CPU 31 generates partial data for figure forming based on the bitmap data generated in S120 or in S140 and the pattern information. More specifically, the CPU 31 applies the pattern indicated in the pattern information to the bitmap data generated in S120 or in S140, so that partial data for figure forming indicating the image-formed area of the figure is filled with a color according to the pattern information is generated. The process proceed to S230.

In S230, the CPU 31 generates image-forming data by combining the partial data currently generated with at least one piece of partial data (if any) that has been previously generated. The process proceeds to S240, wherein the combined image-forming data is stored in the secured memory area of the RAM 35.

That is, in S230, the image-forming data previously generated and stored in the memory area of the RAM 35 is read by the CPU 31 and is combined with the partial data currently generated in S220. Thus, a latest image-forming data is generated. In S240, the image-forming data stored in the memory area of the RAM 35 is replaced (updated) with the latest image-forming data generated in S230.

In S170, when the CPU 31 determines that at least one piece of the figure-describing data remains unprocessed (S170: NO), the process returns to S110. When the CPU 31 determines that entire figure-describing data for one page of the recording sheet has been processed (S170: YES), the process proceeds to S250.

In S250, the CPU 31 reads the latest image-forming data from the RAM 35. Thereafter, in S260, the image-forming data along with an image-forming instruction to cause the printing device 10 to form the image on the recording sheet is passed to the printing device 10.

The printing device 10 that received the image-forming data and the image-forming instruction forms the image based on the image-forming data on the recording sheet. Thereafter, in S190, the CPU 31 examines whether the image-forming data corresponding to all the pages to be printed on the recording sheets is generated. When the CPU 31 determines that the image-forming data to be generated remains unprocessed (S190: NO), the process returns to S110. When the CPU 31 determines that the entire image-forming data for all the pages is generated (S190: YES), the CPU 31 terminates the process.

It should be noted that in S220 and S230 of the present embodiment, similar to S120 and S140 in the first embodiment, the bitmap data is created and modified by executing a ROP, which is supported by GDI of Windows™.

Next, referring back to FIG. 1, an operation executed by the data processing device 30 and the printing device 10 in the image-forming system 200 when the data-generating instruction for image-forming is inputted to the data processing device 30 via the input unit 43 will be described.

When data-generating instruction for image-forming is inputted to the data processing device 30 via the input unit 43, figure-describing data including figure information and pattern information is inputted to the CPU 31. The figure information indicates that a shape of the figure (i.e., the oval), while the pattern information indicates a color of the figure (i.e., yellow). The data processing device 30 creates binary bitmap data that indicates a colorless (i.e., white) oval based on the figure information, as shown in FIG. 3A.

Next, the data processing device 30 generates partial data for figure forming based on the created binary bitmap data and the pattern information that indicates solid yellow of the oval (see FIG. 3B).

The data processing device 30 stores the partial data for figure forming as the image-forming data in the RAM 35. Next, figure-describing data including the figure information, the pattern information, and modifying information is inputted to the CPU 31 of the data processing device 30. The figure information and the pattern information indicate the characters "ABCDE" are formed in blue, while the modifying information indicates the characters are formed in bold font. The data processing device 30 creates binary bitmap data indicating the characters "ABCDE" formed in white based on the figure information, as shown in FIG. 3C. In this phase, the characters "ABCDE" are generated as characters in normal thickness according to normal font data provided to the data processing device 30.

Next, similar to the first embodiment, the data processing device 30 modifies the bitmap data based on the modifying information included in the figure-describing data by enlarging the image-formed area of the characters indicated by the bitmap data.

Next, the data processing device 30 generates the partial data based on the modified bitmap data and the pattern information, as described above. Thereafter, the data processing device 30 reads the latest image-forming data from the RAM 35 and combines the partial data for figure forming with the image-forming data, as shown in FIG. 3E. Thus, the image-forming data as bitmap data that indicates the oval painted in yellow, and the characters "ABCDE" painted in blue in bold font on the yellow oval is generated as shown in FIG. 3E.

Next, the image-forming data stored in the memory area of the RAM 35 is replaced (updated) with the latest image-forming data currently generated as above. When entire image-forming data corresponding to one page of the recording sheet is formed, the data processing device 30 reads the image-forming data from the RAM 35 and outputs the same along with an image-forming instruction to the printing device 10.

The printing device 10 that received the image-forming data and the image-forming instruction forms the image based on the received image-forming data on the recording sheet. Thus, the image of the oval painted in yellow, and the characters "ABCDE" painted in blue in bold font on the yellow oval is generated as shown in FIG. 3E.

As described above, when the figure-describing data includes the modifying information and the figure is modified, the data processing device 30 in the present embodiment, similar to the first embodiment, uses the binary bitmap data generated according to the figure information and modifies the figure in the bitmap data based on the modifying information.

According to the configuration of the data processing device 30 described above, the modification is applied to the binary bitmap data, so that the volume of the memory for the modification process can be reduced. Further, in the present embodiment, the pieces of partial data are generated in the data processing device 30. Therefore, the present invention can be applied to the printing device 10 that is not adapted to generate the partial data (i.e., to combine the figure information and the patter information).

Further, according to the present embodiment, when the partial data for figure forming is generated, the printing device 10 uses the bitmap data as mask data indicating the image-excluding area being masked. Therefore, the pattern of the figure indicated by the pattern information can be applied to only the image-formed area of the figure. With this configuration, data including the figure information and the pattern information (i.e., the figure-describing data) can be processed to form the figure in a less complicated manner.

Furthermore, according to the present embodiment, when the figure-describing data includes the modifying information, which indicates the characters are modified to be formed in bold font, binary bitmap data for the characters in normal font, which is provided to the data processing device 30, is created, and bitmap data for the characters in bold font can be created by enlarging the image-formed area of the characters in the normal font horizontally and vertically in dots. Therefore, even if the printing device 10 is not provided with bold font data, the printing device 10 is enabled to form the characters in bold font by using the normal font and enlarging the same.

Furthermore, according to the present embodiment, as the characters and the figures to be modified are indicated in bitmap data, the modification based on the modifying information can be applied to the bitmap data, and the bitmap data can be processed in a less complicated manner.

Although examples of carrying out the invention have been described, those skilled in the art will appreciate that there are numerous variations and permutations of the image-forming system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the second embodiment, the image-forming data is stored in the RAM 35, however, the storage may not necessarily be the RAM 35, but the image-forming data may be stored in a non-volatile memory provided to the data processing device 30.

For another example, the amount of the memory area in the RAM to be secured in step S210 is not limited to an amount corresponding to one page of the recording sheet, but may be an amount corresponding to a band, while one page of the recording sheet is divided into bands, and the data processing device is configured to process the image-forming data band by band. In this configuration, an amount of the memory area of the RAM 35 to store the image-forming data may be substantial when an amount corresponding to one band is secured. Further, the amount of the memory area may be increased so that image-forming data corresponding to a plurality of pages can be stored therein when the data processing device 30 is provided with substantial amount of RAM 35.

In the embodiments described above, modification of a figure refers to changing the characters in normal font to the characters in bold font, although the modification is not limited to this, but may include changing a position of a figure and enlarging and contracting a size of a figure, for example.

Further, in the embodiments described above, the image-forming data is formed in the data processing device 30. However, the image-forming data-generating process shown in FIGS. 2 and 4 may be performed by the control unit 19 of the printing device 10 if the figure-describing data is directly inputted to the control unit 19. In other words, the image-forming system of the present invention may be included in the printing device 10.

Furthermore, in the embodiments described above, the image-forming data generated in the data processing device 30 is output to the printing device 10. However, the image-forming data may be output to a display device with a display unit such as a liquid crystal display, so that an image based on the image-forming data can be displayed in the display unit.

Furthermore, as the figure-describing data is inputted to the data processing device 30, and an image based on the figure-describing data is displayed in the display unit 41, the image-forming data-generating process shown in FIGS. 2 and 4 may be executed by the CPU 31 of the data processing device 30.

What is claimed is:

1. A data-generating apparatus configured to generate image-forming data for forming an image of a figure, comprising:
    an input unit configured to receive figure-describing data, wherein the figure describing data received includes figure information, pattern information, and modifying information or figure information, pattern information and excluding modifying information;
    a bitmap data-generating unit that generates binary bitmap data representing the figure and indicating an image-formed area and an image-excluding area based on the figure information, wherein the image-formed area comprises an area wherein the figure is filled with dots and the image-excluding area comprises an area wherein no figure is filled with dots;
    a judging unit that judges whether modifying information is included in the figure-describing data in response to the binary bitmap data being generated, the modifying information including information used to modify the figure;
    a modifying unit that modifies the binary bitmap data based on the modifying information in response to the modifying information being determined to be included in the figure-describing data by the judging unit; and
    an image-forming data-generating unit that generates the image-forming data based on the binary bitmap data modified by the modifying unit and the pattern information in response to the judging unit determining that the modifying information is included in the figure-describing data and generates the image-forming data in response to the judging unit determining that no modifying information is included in the figure-describing data,
    wherein the figure information indicates properties of the figure including a shape, a size, and a position of the figure with respect to a recording medium on which the figure is formed, and wherein the pattern information indicates design properties of the figure including a color and a pattern of the dots to fill the figure.

2. The data-generating apparatus according to claim 1, wherein the shape of the figure is described as a series of lines that indicate a contour of the figure.

3. The data-generating apparatus according to claim 2, further comprising:
    a partial data-generating unit that generates at least one piece of partial data for forming the figure by applying the design properties indicated in the pattern information to the image-formed area of the bitmap data in response to the judging unit determining that the modifying information is included in the figure-describing data, and generates at least one piece of partial data for forming the figure by applying the design properties indicated in the pattern information to the image-formed area of the bitmap data generated by the bitmap data-generating unit in response to the judging unit determining that no modifying information is included in the figure-describing data,
    wherein the image-forming data-generating unit combines the at least one piece of the partial data to generate the image-forming data.

4. The data-generating apparatus according to claim 3,
wherein the partial data-generating unit uses the bitmap data as mask data indicating the image-excluding area being masked and applies the design properties indicated in the pattern information to the image-formed area of the bitmap data when the partial data is generated.

5. The image-generating apparatus according to claim 1,
wherein the modifying information comprises information for modifying a character corresponding to the figure information so that the character is output to be in a bold font provided to the data-generating apparatus,
wherein the bitmap data-generating unit generates binary bitmap data corresponding to the character in normal font in response to the figure-describing data being inputted, and
wherein the modifying unit generates bitmap data corresponding to the character in the bold font based on the bitmap data corresponding to the character in the normal font in response to the judging unit judging that the figure-describing data comprises modifying information to modify a character in the normal font into a character in the bold font.

6. A method for generating image-forming data for forming an image of a figure, the method comprising:
receiving one of figure-describing data including figure information, modifying information and pattern information, and figure-describing data including figure information, pattern information and excluding modifying information;
generating binary bitmap data that represents the figure and indicates an image-formed area and an image-excluding area based on the figure information in response to the figure-describing data being inputted wherein the image-formed area comprises an area wherein the figure is filled with dots and the image-excluding area comprises an area wherein no figure is filled with dots;
determining whether modifying information is included in the figure-describing data in response to the binary bitmap data being generated wherein the modifying information includes information used to modify the figure;
modifying the binary bitmap data based on the modifying information in response to the modifying information being determined to be included in the figure-describing data;
generating the image-forming data based on the modified binary bitmap data and the pattern information in response to the modifying information being determined to be included in the figure-describing data, and
generating the image-forming data based on the generated bitmap data and the pattern information in response to the no modifying information being determined to be included in the figure-describing data,
wherein the figure information indicates properties of the figure including a shape, a size, and a position of the figure with respect to a recording medium on which the figure is formed, and wherein the pattern information indicates design properties of the figure including a color and a pattern of the dots to fill the figure.

7. The method according to claim 6, wherein the shape of the figure comprises a series of lines that indicate a contour of the figure.

8. The method according to claim 6, further comprising:
generating at least one piece of partial data for forming the figure by applying the design properties indicated in the pattern information to the image-formed area of the modified bitmap data in response to the modifying information being determined to be included in the figure-describing data;
generating at least one piece of partial data for forming the figure by applying the design properties indicated in the pattern information to the image-formed area of the generated bitmap data in response to no modifying information being determined to be included in the figure-describing data; and
combining the at least one piece of the partial data to generate the image-forming data.

9. The method according to claim 8,
wherein the bitmap data is used as mask data indicating the image-excluding area being masked when the partial data is generated, and
wherein the design properties indicated in the pattern information are applied to the image-formed area of the bitmap data when the partial data is generated.

10. The method according to claim 6,
wherein the modifying information comprises information for modifying a character corresponding to the figure information so that the character is output to be in a bold font,
wherein binary bitmap data corresponding to the character in normal font is generated in response to the figure-describing data being inputted, and
wherein a process to generate bitmap data corresponding to the character in the bold font is executed in response to modifying information to modify a character in the normal font into a character in the bold font being determined to be included in the figure-describing data.

11. A non-transitory computer-readable medium comprising computer readable instructions that cause a computer to execute steps of:
generating binary bitmap data that represents and indicates an image-formed area and an image-excluding area based on figure information for forming a figure in response to one of figure-describing data including figure information, modifying information and pattern information being inputted, and figure-describing data including figure information, pattern information and excluding modifying information being inputted, wherein the image-formed area is an area wherein the figure is filled with dots and the image-excluding area comprises an area wherein no figure is filled with dots;
determining whether modifying information is included in the figure-describing data in response to the binary bitmap data being generated wherein the modifying information comprises information used to modify the figure;
modifying the binary bitmap data based on the modifying information in response to the modifying information being determined to be included in the figure-describing data;
generating the image-forming data based on the modified bitmap data and the pattern information in response to the modifying information being determined to be included in the figure-describing data, and
generating the image-forming data based on the generated binary bitmap data and the pattern information in response to no modifying information being determined to be included in the figure-describing data,
wherein the figure information indicates properties of the figure including a shape, a size, and a position of the figure with respect to a recording medium on which the figure is formed, and wherein the pattern information indicates design properties of the figure including a color and a pattern of the dots to fill the figure.

12. A data-generating apparatus configured to generate image-forming data for forming an image of a figure based on figure-describing, comprising:
- an input unit configured to receive figure-describing data including figure information, modifying information and pattern information and figure-describing data including figure information, pattern information and excluding modifying information;
- a processing unit;
- memory having machine executable instructions stored thereon, which when executed by the processing unit, cause the data generating apparatus to provide functional units including
  - a bitmap data-generating unit that generates binary bitmap data representing the figure and indicating an image-formed area and an image-excluding area based on the figure information, wherein the image-formed area comprises an area wherein the figure is filled with dots and the image-excluding area comprises an area wherein no figure is filled with dots;
  - a judging unit that judges whether modifying information is included in the figure-describing data in response to the binary bitmap data being generated, the modifying information including information used to modify the figure;
  - a modifying unit that modifies the binary bitmap data based on the modifying information in response to the modifying information being determined to be included in the figure-describing data by the judging unit; and
  - an image-forming data-generating unit that generates the image-forming data based on the binary bitmap data modified by the modifying unit and the pattern information in response to the judging unit determining that the modifying information is included in the figure-describing data and generates the image-forming data in response to the judging unit determining that no modifying information is included in the figure-describing data, wherein the figure information indicates properties of the figure including a shape, a size, and a position of the figure with respect to a recording medium on which the figure is formed, and wherein the pattern information indicates design properties of the figure including a color and a pattern of the dots to fill the figure.

13. The data-generating apparatus according to claim 12, wherein the shape of the figure is described as a series of lines that indicate a contour of the figure.

14. The data-generating apparatus according to claim 13, wherein the machine executable instructions, when executed by the processing unit, further provide functional units including:
- a partial data-generating unit that generates at least one piece of partial data for forming the figure by applying the design properties indicated in the pattern information to the image-formed area of the bitmap data in response to the judging unit determining that the modifying information is included in the figure-describing data, and generates at least one piece of partial data for forming the figure by applying the design properties indicated in the pattern information to the image-formed area of the bitmap data generated by the bitmap data-generating unit in response to the judging unit determining that no modifying information is included in the figure-describing data,
- wherein the image-forming data-generating unit combines the at least one piece of the partial data to generate the image-forming data.

15. The data-generating apparatus according to claim 14, wherein the partial data-generating unit uses the bitmap data as mask data indicating the image-excluding area being masked and applies the design properties indicated in the pattern information to the image-formed area of the bitmap data when the partial data is generated.

16. The image-generating apparatus according to claim 12, wherein the modifying information comprises information for modifying a character corresponding to the figure information so that the character is output to be in a bold font provided to the data-generating apparatus,
wherein the bitmap data-generating unit generates binary bitmap data corresponding to the character in normal font in response to the figure-describing data being inputted, and
wherein the modifying unit generates bitmap data corresponding to the character in the bold font based on the bitmap data corresponding to the character in the normal font in response to the judging unit judging that the figure-describing data comprises modifying information to modify a character in the normal font into a character in the bold font.

* * * * *